United States Patent [19]

Mizuma et al.

[11] 4,012,476

[45] Mar. 15, 1977

[54] MOLDING PROCESS FOR THE MANUFACTURE OF SHAPED CARBON ARTICLES

[75] Inventors: Noriaki Mizuma, Tokyo; Yukikazu Omura, Saitama, both of Japan

[73] Assignee: FMC Corporation, Philadelphia, Pa.

[22] Filed: July 3, 1972

[21] Appl. No.: 268,568

[52] U.S. Cl. .......................... 264/29.1; 106/193 R; 106/197 C; 252/421
[51] Int. Cl.[2] ................ B29C 25/00; C01B 31/02; C01B 31/04
[58] Field of Search ......... 264/29; 106/197 C, 193, 106/204; 252/421

[56] References Cited

UNITED STATES PATENTS

| | | | |
|---|---|---|---|
| 3,383,439 | 5/1968 | Tully et al. | 264/29 |
| 3,592,883 | 7/1971 | Kawakubo | 264/29 |
| 3,639,266 | 2/1972 | Battista | 264/29 |
| 3,682,686 | 8/1972 | Nakamura et al. | 264/29 |

*Primary Examiner*—Donald J. Arnold
*Attorney, Agent, or Firm*—Charles H. Johnson; Pauline Newman; Eugene G. Seems

[57] ABSTRACT

A molding process for the manufacture of shaped carbon articles wherein a mixture of pitch, tar, finely-divided coke and microcrystalline cellulose is formed, the mixture compressed to form a shaped article, and the article calcined.

6 Claims, No Drawings

MOLDING PROCESS FOR THE MANUFACTURE OF SHAPED CARBON ARTICLES

Generally, various types of carbon products, for example, electrodes, carbon black particles, heat exchangers and filters, are manufactured from finely-divided coke, to which tar and pitch have been added, by means of molding processes such as compression molding and extrusion molding. These molding processes are, however, not necessarily wholly satisfactory from the viewpoint of the methods of molding and the physical properties of the moldings obtained. More specifically, a decrease in the strength due to uneven compressional force and a lowering in the strength at the time of calcination may pose critical problems depending upon the end use of the carbon product.

With a view to finding a solution to the above, attempts have been made to enhance the effect of tar and pitch with use of additives. It is believed to be extremely difficult, however, to find an additive which is suitable for all purposes because the additive becomes a hindrance at times depending on its properties, and the strength at the time of calcination sometimes decreases as a result thereof.

In view of the above, various substances were examined to determine whether they would enhance the tar and pitch effect and as to their effects on the treatment steps after molding. It was discovered that microcrystalline cellulose is a particularly excellent additive and that natural gum and cellulose derivatives further enhance the effect of microcrystalline cellulose, thus providing the present invention.

This invention relates to a method of preparing shaped carbon products comprising forming a mixture of tar, pitch, finely-divided coke and microcrystalline cellulose in an amount sufficient to improve uniformity of distribution of the mixture under compression but less than 2.0% based on the weight of the tar, pitch and carbon in the mixture, and compressing the mixture into a shaped article. Preferably, the microcrystalline cellulose is used in an amount of from about 0.1 to about 0.5%.

Water-soluble gums including natural gums or cellulose derivatives are also advantageously added to the mixture in the method of this invention. These water-soluble materials are used in amounts of at least 5 up to 25%, preferably 10 to 20% based on the weight of the microcrystalline cellulose.

Guar gum or locust bean gum are examples of water-soluble natural gums effective in enhancing the effect of microcrystalline cellulose, and carboxymethyl cellulose is an example of a water-soluble cellulose derivative.

The molded carbon products are eventually calcined or graphitized to produce an article suitable for any use to which strong shaped carbon products may be put.

This invention is not only effective in offering a uniform compressional force distribution and an accurate molding process, but is also effective, owing to a high decomposition carbonization temperature of microcrystalline cellulose, in maintaining the strength of the product at the time of calcination.

Although the reason for these effects has not been explained fully, such effects are regarded as attributable to the fact that microcrystalline cellulose of a very small particle diameter contributes to the easy movement of particles, reducing particle-to-particle spaces.

Microcrystalline cellulose, as used herein, is the insoluble residue obtained from the chemical decomposition of natural or regenerated cellulose, and it is characterized by having a level-off degree of polymerization determined by the method stated in "Industrial and Engineering Chemistry", Volume 42, pages 502-7 (1950). The preferred method of forming this microcrystalline cellulose and the details of its characteristics are disclosed, for example, in U.S. Pat. No. 2,978,446 French Pat. No. 1,194,486 and others.

In the hydrolysis of cellulose, the amorphous portions of the original cellulose chains are dissolved, the undissolved portions being in a particulate, non-fibrous or crystalline form as a result of the disruption of the continuity of the fine structures between crystalline and amorphous regions of the original cellulose. Although hydrolysis may be effected by various specific methods, including the use of various acids, bases and enzymes, a direct method which is free of secondary reactions comprises the treatment of the original cellulosic material with 2.5 normal hydrochloric acid solution for 15 minutes at boiling temperature. Another suitable method comprises treating the cellulosic material with 0.5% hydrochloric acid solution (0.14 normal) at 250° F. for 1 hour. The microcrystalline cellulose or cellulose crystallite aggregates resulting from hydrolysis and washing steps are further characterized by having a particle size in the range of 1 or 2 to 250 to 300 microns, as determined visibly by microscopic examination. By subjecting the foregoing product to a mechanical disintegration, there is produced a material having a size in the range of less than 1 to about 250 or 300 microns. Within this range, the particle size and size distribution are variable, it being understood that the size and size distribution can be selected to suit a particular end use. In general, mechanically disintegrated particles are preferred.

On drying the attrited hydrolysis products, for example, by freeze drying, spray drying, drum drying, solvent displacement and the like, some coalescence will occur to reform larger particles of microcrystalline cellulose but these are all well below a particle size of 300 microns, preferably averaging between about 20 and 100 microns in their largest dimension. In short, this material contains substantially no amorphous area of cellulose, and has a particle size less than about 300 microns (Stokes diameter).

EXAMPLE 1

500 g. each of tar and pitch of 100 poises and a specified amount of microcrystalline cellulose were added to 5 kg. each of finely-divided coke, and the resultant mixture was pressed into a cylindrical mold of 60 mm. in diameter and 90 mm. in height by applying a pressure of 2 tons. On the molding obtained, lines were drawn in the direction of the exerted pressure to divide said molding into three equal portions. Weight was placed on the molding with the use of a hardness tester apparatus in a direction perpendicular to the direction of the exerted pressure, and the loads at the time when each portion was broken were obtained. The results are given in the following table:

Table 1

| Sample No. | Amount of MC* Added | Breaking Load (kg.) | | |
|---|---|---|---|---|
| | | Upper** Portion | Central** Portion | Lower** Portion |
| 1 | 0 | 10.5 | 7.3 | 5.4 |

Table 1-continued

| Sample No. | Amount of MC* Added | Breaking Load (kg.) Upper** Portion | Central** Portion | Lower** Portion |
|---|---|---|---|---|
| 2 | 0.1 | 14.8 | 14.2 | 13.5 |
| 3 | 0.5 | 15.1 | 14.7 | 14.0 |

*Microcrystalline cellulose
**Divided portions of the molded cylinder.

From the above table, it is clear that the samples (Samples 2 and 3) to which microcrystalline cellulose was added had higher breaking strength than that (Sample 1) to which no microcrystalline cellulose was added.

Then, these samples were graphitized, and their breaking strength in the direction of the originally exerted pressure was obtained, the results of which are given in the following table. It is seen that the results given in Table 1 are reflected in Table 2.

Table 2

| Sample No. | Amount of MC* Added (Wt.%) | Breaking Load (kg.) |
|---|---|---|
| 1 | 0 | 42 |
| 2 | 0.1 | 63 |
| 3 | 0.5 | 65 |

*Microcrystalline cellulose

EXAMPLE 2

Tar and pitch of 100 poises were each added, in the amount of 18% by weight of the mixture, together with a specified amount of microcrystalline cellulose or microcrystalline cellulose-water-soluble gum mixture, to 5 kg. each of finely-divided coke. The mixture, in each case, was kneaded for 30 minutes in a kneader heated to 180° C., extruded in the shape of a cylinder of 16 mm. in diameter using a screw-type extruder, cut to a length of 30mm., and the pellets allowed to cool. Weight was placed on the product in a direction perpendicular to the direction of the originally exerted pressure to obtain breaking loads, which are given in the following table:

Table 3

| Sample No. | Amount of Additives Added (wt.%) | Breaking Load (kg.) |
|---|---|---|
| 1 | 0 | 8.3 |
| 2 | MC* 0.2 | 13.2 |
| 3 | MC* 0.5 | 14.0 |
| 4 | MC* 1.5 | 13.7 |
| 5 | MC* 2.0 | 13.5 |
| 6 | MC* 0.1 Carboxymethyl cellulose 0.01 | 14.1 |
| 7 | MC* 0.2 Guar gum 0.02 | 12.9 |

*Microcrystalline cellulose

It is apparent that microcrystalline cellulose contributes to the attainment of uniform flowing and to making particle-to-particle spaces very small.

Various changes and modifications may be made in practicing the invention without departing from the spirit and scope thereof and, therefore, the invention is not to be limited except as defined in the appended claims.

We claim:

1. A method of forming shaped carbon products comprising forming a mixture consisting essentially of tar, pitch, finely-divided coke and microcrystalline cellulose in an amount sufficient to improve uniformity of distribution of the mixture under compression but less than 2.0% based on the weight of the combined tar, pitch and coke, and compressing the mixture into a shaped article.

2. The method of claim 1 wherein a water-soluble gum in an amount of from about 5 up to about 25% based on the weight of the microcrystalline cellulose is included in the mixture.

3. The method of claim 1 wherein the shaped article is calcined.

4. The method of claim 1 wherein the shaped article is graphitized.

5. The method of claim 2 wherein the shaped article is calcined.

6. The method of claim 2 wherein the shaped article is graphitized.

* * * * *